United States Patent [19]

Easley

[11] Patent Number: 4,517,746

[45] Date of Patent: May 21, 1985

[54] METHOD AND APPARATUS FOR DECODING WAFER COMBINATION LOCKS

[76] Inventor: Thomas E. Easley, 1303 Fourth St., La Grande, Oreg. 97850

[21] Appl. No.: 499,275

[22] Filed: May 31, 1983

[51] Int. Cl.[3] ................................................ G01B 5/20

[52] U.S. Cl. ........................................ 33/549; 70/394

[58] Field of Search ................ 70/394, 399; 33/174 F; 362/100

[56] References Cited

U.S. PATENT DOCUMENTS

| | | | |
|---|---|---|---|
| 1,991,151 | 2/1935 | Hansen | 33/174 F |
| 2,087,423 | 7/1937 | Abrams | 33/174 F |
| 2,727,312 | 12/1955 | Tampke | 33/174 F |
| 3,087,050 | 4/1963 | Rubens | 70/394 |
| 3,109,243 | 11/1963 | McCormick | 33/174 F |

*Primary Examiner*—Gary L. Smith

*Assistant Examiner*—Thomas J. Dubnicka

*Attorney, Agent, or Firm*—Chernoff, Vilhauer, McClung, Birdwell & Stenzel

[57] ABSTRACT

A probe for manually decoding a lock of the wafer combination type having an elongate body to slideably engage the keyway, the body comprising at least two hollow tubular members. Within the hollow members are rotatably disposed detecting members which detect, by means of physical contact, certain identifying portions of wafers therein which form the combination of the lock. An indicator on the outside of the probe, responsive to the detecting members, indicates the presence, type, and orientation of the wafers. The same method may be practiced without the use of the probe by viewing the interior of the lock slightly off center with a pencil beam of light to determine the same characteristic wafer portions.

6 Claims, 11 Drawing Figures

FIG. 1
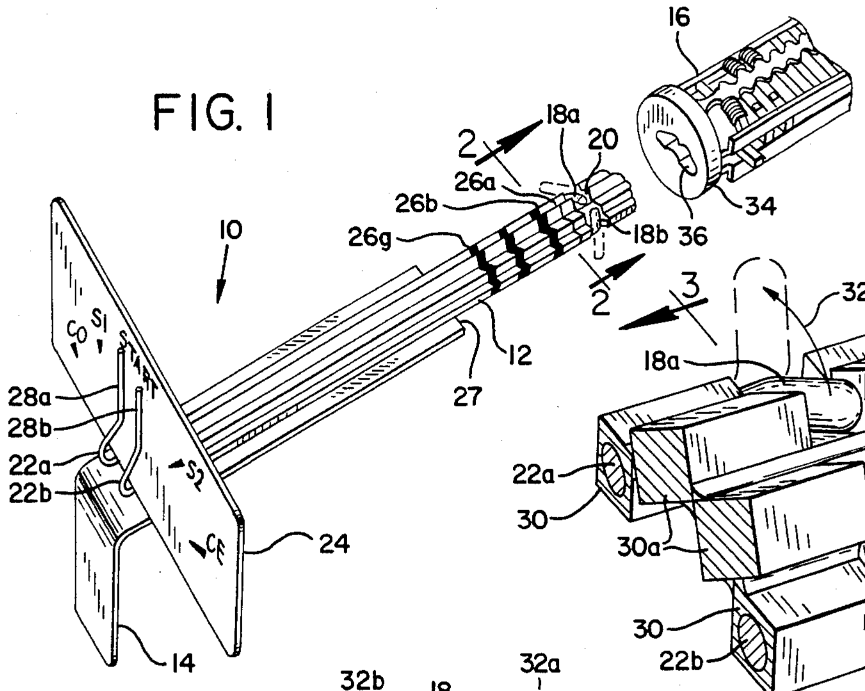
FIG. 2
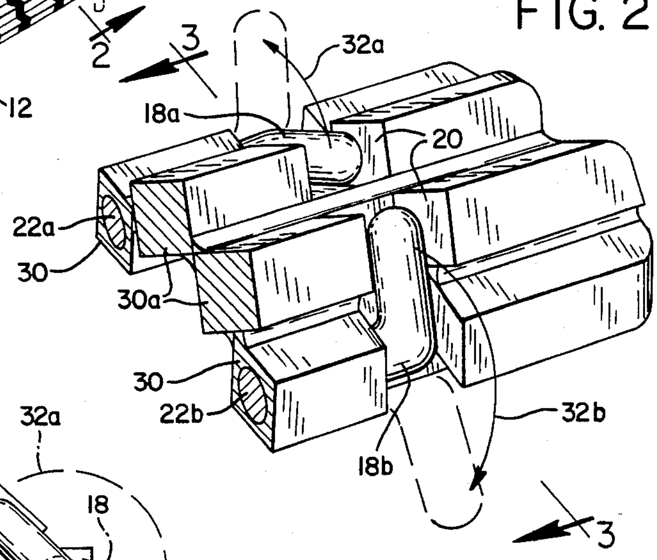
FIG. 3
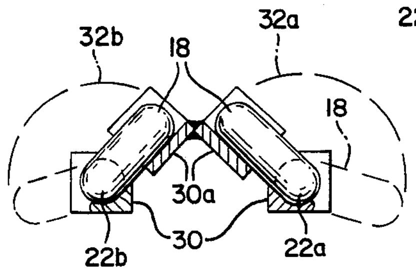
FIG. 4
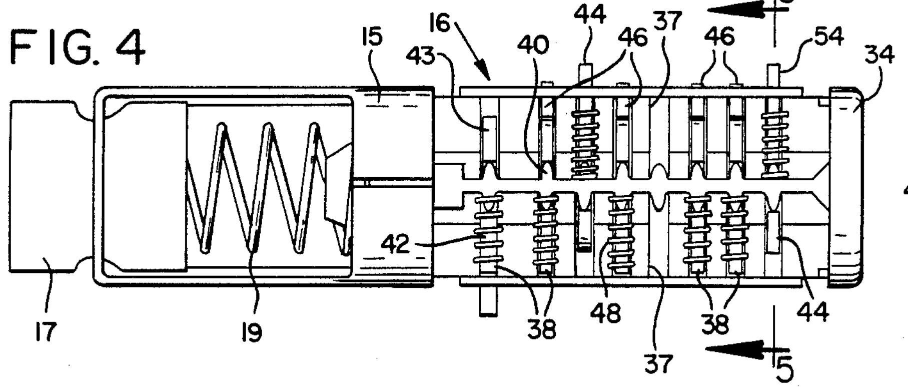
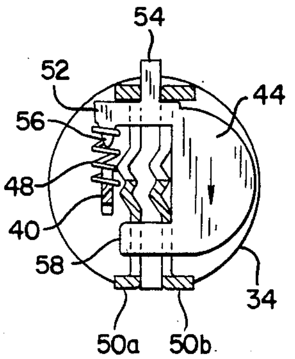
FIG. 5
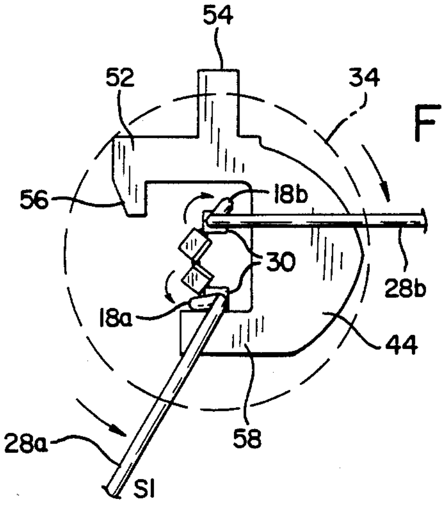
FIG. 6
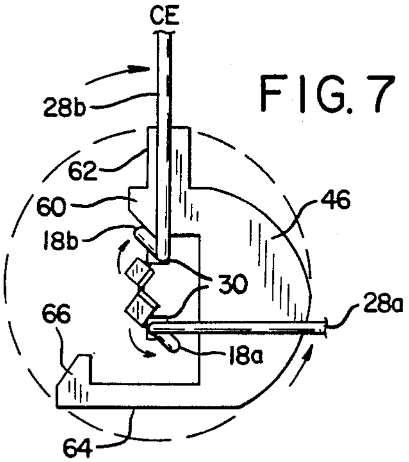
FIG. 7

METHOD AND APPARATUS FOR DECODING WAFER COMBINATION LOCKS

BACKGROUND OF THE INVENTION

The present invention relates to a method and apparatus for decoding a lock of the wafer combination type such as that commonly marketed under the trademark SCHLAGE.

Such wafer combination lock is found primarily in apartment complexes because it is a master-keyed type of lock, that is, there is a master key which will open all of the locks in a particular complex. In such locks a plurality of wafers, which are essentially semi-circular discs having a radial protrusion or pin, are inserted into slots arranged from front to rear in columns of two in a keyway cylinder. The wafers are spring biased, and depending on the type of wafer, the pin either extends outwardly of the keyway cylinder or retracts under normal bias action of the springs. The purpose of the pins is to prevent the keyway cylinder from turning and thus opening the lock. Only when the proper key is inserted will all of the pins retract and allow the lock to open.

There are three types of wafers used in such locks: "series;" "combination;" and "master" wafers. For each wafer there are two possible orientations. "Series" wafers are either "S1" or "S2," and combination wafers are "odd" or "even." The single master wafer (if used) has an orientation opposite that of the series wafers. All series wafers have the same orientation.

All three types of wafers, "master," "series" and "combination," resemble generally the letter "C." Each is a semi-circular disc with two extending arms, and an outwardly radially-extending pin or protrusion, and a second protrusion or tooth on one arm of the wafer which acts as a seating member for springs which bias the wafers in a predetermined fashion. Both protrusions lie in the plane of the wafer.

The keyway cylinder comprises a frame portion in which is located the master wafer column and seven other wafer columns for the series and combination wafers. The series and combination wafers may be arranged according to the desire of the user; however, there will always be 4 combination wafers and at least one series wafer. If desired, there may be one or more columns left completely blank with no wafer at all.

The orientation of these types of wafers in the columns of the keyway cylinder determines the alpha-numeric code of the lock and provides all of the information necessary to cut a key that will open the lock.

Heretofore, it has not been possible to manufacture replacement keys for wafer combination locks without entirely removing the lock from its fixed surroundings, i.e., the door. This is because in order to make a replacement key, it is necessary to actually see the wafers that are used in the combination lock and visually observe the type and orientation of each wafer used in the combination. Only in this way could an alpha-numeric code, representing the orientation and position of cuts to be made on a key blank, be obtained.

Thus, if it were possible to determine for each wafer column the type of each wafer, that is, whether "combination" or "series," and its orientation, without disassembling the lock, it would be possible to determine the code for the lock and make a key corresponding to the code which would fit and open the lock.

SUMMARY OF THE INVENTION

The present invention provides a method and apparatus for determining the code of a wafer combination type lock without disassembling the lock. According to the method of the invention, one may observe, through the keyway, by either visual or mechanical means, the type and orientation of each wafer at each position in the keyway cylinder and convert this information into the proper alpha-numeric code. A key may then be made according to that alpha-numeric code which will open the lock. Both the code and the method of making a key from the code are well-known in the art.

According to the invention "combination" wafers are distinguished from "series" wafers by the detection of a cut-off corner or chamfered portion on one arm of the wafer. Series wafers do not have a chamfered portion but have an essentially rectangular arm.

These different characteristics may be either visually observed or manually sensed through the use of a probe. The probe of the invention has an elongate base member of a shape adapted to slidably engage the keyway. Contained within the probe are at least two hollow and substantially parallel portions extending longitudinally. The probe may in fact be constructed of a plurality of long hollow tubes welded together into a shape that will fit within the keyway. Lying within two of these hollow portions are elongate rigid members which may be made of stiff wire or the like. Near one end of the probe is a notch cut into two of the hollow portions so as to expose the wire's ends. Each wire end comprises a relatively short portion bent at a 90° angle which forms a leg. The other end of the wire is bent to form a dial or pointer, or may be connected to any suitable indicating means to indicate the length of the arc of the leg in a plane perpendicular to the longitudinal direction of the probe. The wire lies relatively loosely within the hollow portion of the probe and thus can rotate about its longitudinal axis. Marked on the base of the probe are probe depth increment markings. As the probe is inserted into the keyway, the markings indicate the positon of the notch relative to a given wafer column. When positioned at a chosen wafer column, as indicated by the appropriate probe depth increment mark, the dial or pointer is manually rotated causing the leg end of the wire to describe an arc. The leg will rotate until it contacts one arm of the wafer lying within the particular column. Due to the aforementioned differences between the arms of the different types of wafers, the point of contact and, hence, the length of the arc will differ. Once contact is sensed between the leg and the wafer, a scale on the front of the probe, calibrated to the dial of the pointer, will indicate the type and orientation of the particular wafer encountered. If this process is repeated for every column position in the keyway frame, the alpha-numeric code of the key may be readily obtained.

The method of the invention may also be practiced without the use of the aforementioned probe. With the aid of a "zip scope" or other suitable illuminating device, capable of emitting a pencil beam of light, the interior of the lock may be examined from the outside. By viewing the interior of the key way unit slightly off-center from the longitudinal axis of the keyway, one may determine by visual inspection the type of wafer (series or combination) and its slot location. The chamfered portion of a combination wafer is easily visible with the aid of a zip scope, which distinguishes the combination wafer from the series wafer. Moreover, it is not necessary to actually see the master wafer since wafer combination locks are designed such that the master wafer is always oriented in a direction opposite that of the series wafers, and all series wafers are oriented in the same direction.

It is therefore an object of this invention to provide a method and apparatus for decoding a wafer combination lock without the necessity for removing the lock from its fixed surroundings.

It is a further object of this invention to provide an apparatus for sensing the type and orientation of wafers constituting the code of the combination wafer lock thereby enabling a key to be made without disassembling the lock.

It is a further object of this invention to provide a method for determining the code of a wafer combination lock by visual inspection of certain characteristics of the combination wafer in the interior of the lock without removing the lock from its fixed surroundings.

These and other objects of the invention will become apparent by reference to drawings and the detailed description of the invention which follows.

BRIEF DESCRIPTION OF THE DRAWINGS

FIG. 1 is a perspective view of a probe for manually decoding a combination wafer lock, shown in position preparatory to insertion into a lock oriented horizontally for sake of illustration.

FIG. 2 is an enlarged perspective view of the end portion of the probe taken along line 2—2 of FIG. 1.

FIG. 3 is a cross-sectional view taken along line 3—3 of FIG. 2.

FIG. 4 is a side view of a vertically-oriented keyway cylinder which is part of a wafer combination lock.

FIG. 5 is a partially sectional front view taken along line 5—5 of FIG. 4.

FIG. 6 is a front view of a series wafer showing the probe of FIG. 1 juxtaposed therewith.

FIG. 7 is a front view of a combination wafer showing the probe of FIG. 1 juxtaposed therewith.

DETAILED DESCRIPTION OF THE INVENTION

Figure 8:
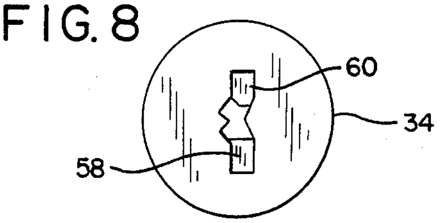
FIG. 8 is a front view of the face cap of the keyway cylinder as it would appear inserted into a doorknob, showing the visible characteristic portions of combination and series wafers within the keyway.

Referring now to the drawings, FIG. 1 shows a probe for decoding a combination wafer lock in accordance with the invention. An elongate probe 10 comprises a base 12 constructed of two pieces of elongate brass tubing 30 and two pieces of elongate brass rod 30*a*, all of essentially square cross-section as shown in FIG. 2. The four pieces of tubing are welded together to form a cross-sectional shape corresponding to the keyway frame style. In the embodiment shown in FIGS. 1, 2 and 3, the keyway frame style is a "W." For an "A" style keyway frame the tubing would be welded together to form an "A" so as to slideably engage the keyway.

The probe has an L-shaped mounting bracket or finger grip 14 for supporting the body of the probe 12 and providing a convenient grip for inserting and manipulating the probe. Connected to fingergrip 14 by welding or any other suitable method of attachment is a reader board 24 having markings thereon which indicate the type and orientation of the wafers to be tested inside the lock. The probe is intended to be slideably inserted into keyway cylinder 16 which has a face cap 34 and a keyhole of the "W" style 36. Brass tubing 30 is hollow and inserted through the tubing are two stiff wires 22*a* and 22*b*. Wires 22*a* and 22*b* have pointer portions 28*a* and 28*b* bent at right angles so as to form indicators for reader board 24. At the opposite end of the probe there is a notch 20. The opposite ends of stiff wires 22*a* and 22*b* terminate in legs 18*a* and 18*b*, respectively, which are bent at a 90 degree angle to the longitudinal direction of the wires in probe 12 which lie parallel to the longitudinal axis of the keyway, and are also bent inwardly toward the axis of the probe so as to lie flush within notch 20 when the pointers 28*a* and 28*b* of wires 22 are pointing straight up at the "start" indication as shown in FIG. 1. As shown in FIG. 2, legs 18*a* and 18*b* move in arcs generally designated at 32*a* and 32*b*, respectively, upon movement of pointers 28*a* and 28*b*.

Probe 12 has a series of increment depth marks such as those indicated at 26*a* and 26*b*. These marks consist of alternately colored light and dark bands. The purpose of these bands is to allow the user to position the probe such that notch 20, in which lie leg members 18*a* and 18*b*, may be aligned sequentially with the wafer columns of the keyway cylinder. These columns are indicated generally at 38 in FIG. 4. As the probe notch 20 is aligned with each one of the columns 38, legs 18*a* and 18*b* may test for the presence of particular types and particular orientations of wafers which may be located therein. When the probe is inserted to a depth indicated by probe increment mark 26*a*, for example, the probe tests for wafers in the wafer column nearest to the face cap 34. At probe increment mark 26*b* the probe is testing for a wafer located at the next deeper column. This same sequence obtains all the way to probe increment mark 26*g* at which point the user is testing for a wafer in the deepest column. The final test involves inserting the probe until it can go no farther, stopped by shoulder stop 27 the end-most point on fingergrip and L-shaped mounting bracket 14. When thus inserted all the way into key way unit, the probe is in a position to test for a wafer in the master wafer column.

The way in which the probe tests for the presence, type and orientation of wafers is shown generally in FIGS. 4, 5, 6 and 7. FIG. 4 shows a typical keyway cylinder 16 loaded with combination and series wafers. The front of the keyway cylinder has a cylindrical face cap 34 where keyway 36 is located. Connected to the face cap and forming the keyway frame style are a pair of frame members 50*a* and 50*b* (FIG. 5). These frame members extend longitudinally, terminating at a single cylinder support member 15. Cylinder support member 15 includes a plunger spring 19 and a keyway cam 17. Keyway cam 17 accuates the lock upon rotation of keyway cylinder 16 allowing the door to open. Located adjacent frame member 50*a* and 50*b* and extending in a longitudinal direction parallel to those members is a spring rack 40. Spring rack 40 is fixedly attached to face cap 34 and to cylinder support member 15. Spring rack 40 has a series of teeth on which are mounted springs 48. The springs are used to bias the wafers in a manner which will be described herein.

Figure 11:
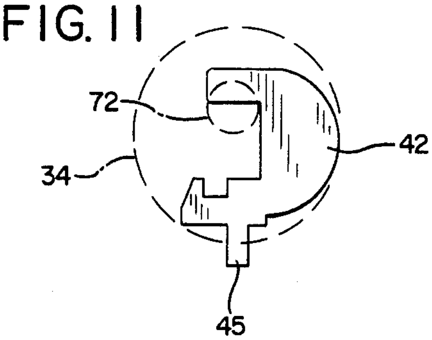
FIG. 11 is a schematic representation of the spatial relationship between the face cap of FIG. 8 and a master cylinder wafer located in the master wafer column in the keyway.

The way in which the wafers are mounted in the keyway cylinder can be seen in FIG. 5. Except for a single master wafer 42 as shown in FIG. 11, the wafers used in a combination wafer lock are either "series" wafers such as 44 shown in FIGS. 5 and 6, or "combination" wafers such as 46 shown in FIG. 7.

FIG. 5 illustrates the way in which a typical wafer is inserted and biased in the keyway unit. Series wafer 44 is an essentially semi-circular disk having a long arm 52 on which is located a tooth 56 to engage spring 48 which is mounted on spring rack 40. Long arm 52 also has a protrusion or pin 54 which extends between keyway frame members 50*a* and 50*b* outwardly radially of the keyway cylinder. This extension of pin 54 is caused by the normal bias action of spring 48 and will prevent the keyway cylinder from being turned unless the key inserted into the lock has a blank portion at the column in which the series wafer lies. For a key to have a blank portion means that no cut has been made in the body of the key. Such a blank would cause the wafer to move in the direction shown by the arrow in FIG. 5 and retract pin 54 in a radially inwardly direction, consequently allowing keyway cylinder unit 16 to rotate and open the lock.

For a combination wafer such as 46 shown in FIG. 7, the mechanics of opening the lock are just the opposite. In a combination wafer, the positions of the short arm and long arm are reversed such that the bias action of the spring holds pin 62 of combination wafer 46 in a normally retracted condition. Only an appropriate cut in the key blank at the location of each combination wafer will keep the combination wafer retracted. In the event that cut is not made, the key blank will force pin 62 in radially outward direction so as to resemble the normally outwardly protruding positon of pin 54 for series wafer 44. Like the series wafer, combination wafer 46 has a long arm 64 with a tooth 66 and a short arm 60. However, in the combination wafer, pin 62 is located on the short arm 60, not on the long arm as is the case with series wafers.

The most important distinguishing feature between combination wafer 46 and series wafer 44 is that the short arm of combination wafer 46 is chamfered. That is, where series wafer 44 has a normally rectangular short arm 58, short arm 60 of combination wafer 46 has its inside corner cut off at an approximately 45° angle so as to form a chamfered surface. This difference allows the probe to distinguish between series and combination wafers at each wafer column.

FIG. 4 illustrates the manner in which the plurality of series and combination wafers may be inserted into a keyway unit so as to form a combination for the lock. The keyway cylinder of FIG. 4 is similar to that shown in FIG. 1 except that in FIG. 4 the cylinder has been rotated about 90 degrees in a counter clockwise direction. FIG. 4 illustrates a wafer combination code consisting of 2 series wafers 44, 4 combination wafers 46 and a master cylinder wafer 42. The wafers have been inserted into columns 38 in the keyway frame members 50*a* and 50*b*. They are held in columns 38 and biased in the correct direction by the action of springs 48. Each of columns 38 has two slots 37. Although a wafer occupies an entire column, for purposes of forming the code for which a key may be cut, a wafer is considered to occupy only one slot within a column. The particular slot that is occupied will be the slot occupied by the short arm of the wafer. This slot will always be the slot opposite that adjacent the spring.

The way in which the probe decodes the lock is shown in FIGS. 6 and 7. FIG. 6 shows a series wafer 44 being tested by probe 10. The probe has been inserted such that notch 20 lies adjacent the first column of the keyway cylinder. This is accomplished by aligning probe depth increment marker 26*a* with face cap 34. Once this alignment has been accomplished, the user rotates pointer portions 28*a* and 28*b* of wires 22*a* and 22*b* until resistance is encountered. FIG. 6 demonstrates that resistance will be encountered when leg 18*a* of wire 22*a* makes contact with the short arm portion 58 of wafer 44. The reader board 24 has been calibrated such that for this particular orientation an "S1" reading is indicated by pointer 28*a*. Thus, from the test, it is known that an "S1" series wafer lies in column 1 of keyway cylinder 16.

In a similar manner, FIG. 7 shows how a combination wafer is detected. In this case, leg 18*b* makes contact with the chamfered short arm 60 of combination wafer 46. Because of the chamfered surface of short arm 60, the arc described by leg 18*b* is longer and consequently, reader board 24 indicates, by means of pointer 28*b* the existence of a "combination even" wafer at this point of contact.

The above process is repeated for each column in the keyway cylinder, as determined by the probe depth increment markings, and proceeding column by column. The user tests at each column position for the presence, type, and orientation of the wafers. In each case one of legs 18*a* or 18*b* will encounter resistance at a point along the arc 32*a* or 32*b* described by the rotation of the leg. One of the pointer portions will then indicate the type and orientation of the wafer encountered.

It is not necessary, however, for all wafer columns to have a wafer inserted therein. Some columns may be left blank. In such a case, no resistance is encountered by either leg, and thus the pointers 28*a* and 28*b* complete an arc of almost 180 degrees indicating that the particular column under test is blank.

It is not actually necessary to test the master wafer column because of certain conventions observed in the art when constructing the code. First, the wafer present in the master wafer column is always oriented in a direction opposite that of the series wafers, whose orientation are all the same. Thus, the detection of the first series wafer determines the orientation of all other series wafers and the wafer in the master column. FIG. 11 illustrates a master wafer 42 having a pin 45 oriented opposite that of series wafer 44. Second, although series wafers may be used in the master column, it is most often the case that a master wafer is used. Thus, one may assume when cutting a key that a master wafer is present. If desired, however, one may test the master column. A master wafer is distinguishable from a series wafer by the resistance encountered at approximately 115° from vertical on the wire opposite the wire yielding a series wafer reading. Thus, if no resistance is encountered by this wire in the master wafer slot, a series wafer, not a master wafer, is present.

Thus, the entire alpha-numeric code for the particular lock may be determined by inserting the probe and testing, at each column as indicated by the probe depth increment markings, for the presence of series or combination wafers and their particular orientation. Once this information is known, a key for the lock may be cut on a conventional key cutting machine which will open the lock.

Figure 9:
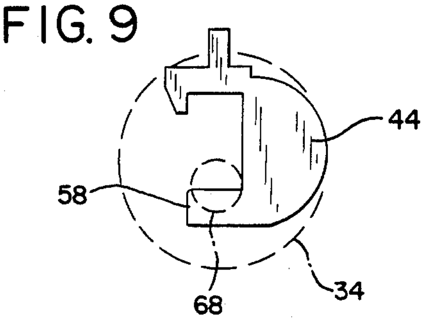
FIG. 9 is a schematic representation of the spatial relationship between the face cap of FIG. 8 and a series wafer located at one column in the keyway.
Figure 10:
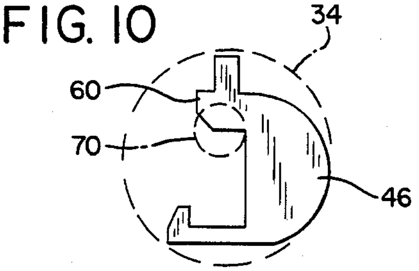
FIG. 10 is a schematic representation of the spatial relationship between the face cap of FIG. 8 and a combination wafer located at one column in the keyway.

The same information may be obtained without the use of a probe. Viewing the interior of the lock from the outside as shown in FIG. 8, reveals that wafers may be seen by visual inspection of the interior of the lock. In order to inspect the lock in such a manner, a pencil beam of light known generally in the art as a "zip scope" is used. With the aid of such a device, one may visually observe at each wafer column, and its corresponding slot positions, the presence or absence of a combination or series wafer. In order to view wafer columns within the interior of the keyway, the observer must shift his line of sight to a position slightly off center, that is skewed for the longitudinal axis of the keyway. For example, with the aid of a zip scope the user would observe that all of the combination wafers of the lock depicted in FIG. 4 are "combination even" wafers since the chamfered short arm portion 60 of the wafers 46 are on the top. At least one series wafer has a short arm 58 in the lower slot indicating an S1 orientation for all series wafers. Within the dotted small circles 68 and 70 in FIGS. 9 and 10, respectively, are shown the portions seen by the observer looking into the keyway. These portions indicate either series or combination wafer types in the lock viewed in the manner shown in FIG. 8. In FIG. 11 dotted circle 72 indicates that an observer will view the master column wafer as having an orientation opposite that of the series wafers.

All of the information necessary to derive the alphanumeric code may be obtained by using either the probe of FIG. 1 or by visually inspecting the interior of the lock with a zip scope or the like as previously disclosed herein. With the code, a key may be made on any standard key cutting machine as is well known in the art and the door may then be opened without having to disassemble the lock.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. An elongate probe, for decoding a lock of the wafer combination type, adapted to slidably engage an elongate keyway cylinder having a plurality of wafers therein of different physical configurations and different orientations distributed along the length of said keyway at spaced positions, said probe having detecting means for detecting at each wafer position in said keyway cylinder the presence, physical configuration and orientation of each wafer therein said detecting means comprising elongate rotatable means mounted within said probe for rotation about an axis extending longitudinally of said probe for making contact with portions of said wafers.

2. The apparatus of claim 1 wherein said probe includes indicator means responsive to said detecting means for indicating the presence, physical configuration and orientation of each of said wafers.

3. The apparatus of claim 1 wherein said probe includes depth increment means for indicating the sequential position of each wafer along said keyway cylinder.

4. The apparatus of claim 1 wherein said rotatable means comprises an arm extending radially from said axis for making contact with portions of said wafers.

5. The apparatus of claim 1 wherein said probe comprises at least two hollow elongate tubular members extending longitudinally of said probe, said rotatable means comprising a respective elongate member extending rotatably through each of said tubular members.

6. A method of decoding a lock of the wafer combination type, having a plurality of wafers therein of different physical configurations and different orientations distributed along the length of an elongate keyway cylinder at spaced wafer positions, without removing the lock from its fixed surroundings comprising the steps:

(a) inserting into said keyway cylinder an elongate probe adapted to slidably engage said keyway cylinder; and (b) detecting through said probe, at each wafer position in said keyway cylinder, the presence, physical configuration and orientation of each wafer therein by moving a portion of said probe transversely to the length thereof into contact with a portion of each of said wafers.

* * * * *